US012715086B2

(12) United States Patent
Nowak et al.

(10) Patent No.: US 12,715,086 B2
(45) Date of Patent: Aug. 25, 2026

(54) VACUUM BLOCKING PIECE AND METHOD FOR MANUFACTURING A SPECTACLE LENS

(71) Applicants: Carl Zeiss Vision International GmbH, Aalen (DE); Opto Tech Optikmaschinen GmbH, Jena (DE)

(72) Inventors: Gerd Nowak, Neresheim (DE); Wito Hartmann, Aalen (DE); Roland Mandler, Wettenberg (DE); Oswin Lack, Hüttenberg-Weidenhausen (DE)

(73) Assignees: Carl Zeiss Vision International GmbH, Aalen (DE); Opto Tech Optikmaschinen GmbH, Jena (DE)

( * ) Notice: Subject to any disclaimer, the term of this patent is extended or adjusted under 35 U.S.C. 154(b) by 0 days.

(21) Appl. No.: 19/266,669

(22) Filed: Jul. 11, 2025

(65) Prior Publication Data

US 2025/0339936 A1 Nov. 6, 2025

Related U.S. Application Data

(63) Continuation of application No. PCT/EP2024/059638, filed on Apr. 9, 2024.

(30) Foreign Application Priority Data

Apr. 11, 2023 (EP) .................................... 23167300

(51) Int. Cl.
*B25B 11/00* (2006.01)

(52) U.S. Cl.
CPC .................................. *B25B 11/005* (2013.01)

(58) Field of Classification Search
CPC ..... B25B 11/00; B25B 11/005; B25B 11/007; B24B 13/005; B24B 13/0052; B24B 13/0055; B23Q 3/08; B23Q 3/088
(Continued)

(56) References Cited

U.S. PATENT DOCUMENTS 2,958,162 A * 11/1960 Upton ...................... C03B 23/22 65/38
3,134,208 A 5/1964 Richmond
(Continued)

FOREIGN PATENT DOCUMENTS

BR PI0501677 A 5/2006
BR PI0908534 B1 11/2020
(Continued)

OTHER PUBLICATIONS

Author: Gallagher Title: Polyurethane's Coefficient of Friction Pub. Date: Jul. 9, 2022 URL: https://web.archive.org/web/20220709095412/https://gallaghercorp.com/polyurethane-coefficient-of-friction/ (Year: 2022).*

(Continued)

*Primary Examiner* — Brian D Keller
*Assistant Examiner* — Alberto Saenz
(74) *Attorney, Agent, or Firm* — Qubit IP, PLLC

(57) ABSTRACT

A vacuum blocking piece for vacuum blocking a lens blank has a support element with an upper part and a lower part. The lower part can engage with a clamping device for clamping the vacuum blocking piece. The vacuum blocking piece further includes a fluid-permeable blank contacting element. An upper surface of the blank contacting element, which is configured to hold the lens blank, is made of an elastic material. The lower surface contacts the upper part of the support element. The vacuum blocking piece fixes the lens blank to the upper surface of the blank contacting element by applying a vacuum within the blocking piece to provide suction through essentially the entire upper surface of the blank contacting element to fix the lens blank to the upper surface of the blank contacting element and to fix the blank contacting element to the upper part of the support element.

13 Claims, 5 Drawing Sheets

(58) Field of Classification Search
USPC ......... 269/20, 21; 29/559; 451/42, 384, 388, 451/390, 460
See application file for complete search history.

(56) References Cited

U.S. PATENT DOCUMENTS

| | | | | | |
|---|---|---|---|---|---|
| 4,089,102 | A | | 5/1978 | Soper et al. | |
| 4,669,226 | A | * | 6/1987 | Mandler | B24B 13/005 451/384 |
| 4,850,579 | A | * | 7/1989 | Fisher | B26D 7/018 269/21 |
| 6,089,713 | A | | 7/2000 | Hof et al. | |
| 6,126,520 | A | | 10/2000 | Jochim-Schmidt et al. | |
| 2005/0250430 | A1 | | 11/2005 | Volken et al. | |
| 2006/0232085 | A1 | * | 10/2006 | Nagasawa | H01L 21/6838 294/189 |
| 2008/0132157 | A1 | | 6/2008 | Schneider et al. | |
| 2008/0299881 | A1 | * | 12/2008 | Herbin | B24B 13/005 451/390 |
| 2011/0033615 | A1 | | 2/2011 | Breme et al. | |
| 2011/0097484 | A1 | * | 4/2011 | Sakai | B05C 13/025 269/21 |
| 2012/0224140 | A1 | * | 9/2012 | Felten | B24B 13/0057 351/159.73 |
| 2015/0217420 | A1 | | 8/2015 | Mandler | |
| 2016/0003986 | A1 | | 1/2016 | Breme et al. | |
| 2018/0286772 | A1 | | 10/2018 | Yamamoto et al. | |
| 2021/0138603 | A1 | * | 5/2021 | Moine | B24B 13/0052 |
| 2023/0075451 | A1 | | 3/2023 | Nowak et al. | |

FOREIGN PATENT DOCUMENTS

| | | | | | |
|---|---|---|---|---|---|
| CN | 1744970 | A | | 3/2006 | |
| CN | 100515675 | C | * | 7/2009 | B24B 47/12 |
| CN | 101945730 | A | | 1/2011 | |
| CN | 102430969 | A | | 5/2012 | |
| CN | 108705422 | A | | 10/2018 | |
| CN | 115551675 | A | | 12/2022 | |
| DE | 25 31 134 | A1 | | 1/1976 | |
| DE | 3 924 078 | A1 | | 1/1991 | |
| DE | 10 2005 038 063 | A1 | | 2/2007 | |
| EP | 2 266 754 | B1 | | 8/2016 | |
| EP | 4 035 832 | A1 | | 8/2022 | |
| JP | H03121763 | A | | 5/1991 | |
| JP | 2002086327 | A | | 3/2002 | |
| JP | 2006303329 | A | | 11/2006 | |
| KR | 1020230027314 | A | | 2/2023 | |

OTHER PUBLICATIONS

CN 100515675—Machine Translation (Year: 2009).*

Industrial Norm "Production in optical engineering—Connection size for block for manufacturing of ophthalmic lenses—Diameter 43mm," English version DIN 58766:2017, Feb. 2017.

Industrial Norm "Ophthalmic optics—Spectacle lenses—Vocabulary (ISO 13666:2019)," English version EN ISO 13666:2019, Dec. 2019.

Industrial Norm "Rubber, vulcanized or thermoplacstic—Determination of shear modulus and adhesion to rigid plates—Quadruple-shear methods," English version EN ISO 1827:2022, 2022.

European Search Report issued in EP 23 167 300.5, to which this application claims priority, mailed Oct. 20, 2023.

International Search Report and Written Opinion issued in PCT/EP2024/059638, to which this application claims priority, mailed Jul. 8, 2024.

International Preliminary Report on Patentability issued in PCT/EP2024/059638, to which this application claims priority, mailed Apr. 1, 2025.

Industrial Norm "Bonded abrasive products, designation, types, dimensional letters, materials," DIN 69100, Jul. 1988, English-language machine translation attached.

Office Action by the Chinese Patent Office (SIPO) issued in CN 202480010042.5, which is a counterpart hereof, mailed on Oct. 25, 2025, and English-language translation thereof.

Decision of Refusal by the Korean Patent office issued in KR10-2025-7028993, which is a counterpart hereof, mailed Nov. 14, 2025, and English-language machine translation thereof.

Intention to grant by the European Patent Office issued in EP 24 716 192.0, which is a counterpart hereof, mailed Nov. 18, 2025.

Notice of Allowance by the Canadian Patent Office issued in CA 3,280,097, which is a counterpart hereof, mailed Nov. 26, 2025.

B. Olam "Handbook of Common New Building Materials," Sweet Publishers, pp. 252 to 254, Dec. 1988, and English-language translation thereof.

Office action by the Chinese Patent Office issued in CN 202480010042.5, which is a counterpart hereof, mailed Mar. 1, 2026, and English-language machine thereof.

Office action by the Mexican Patent Office issued in MX/a/2025/009258, which is a counterpart hereof, mailed Feb. 9, 2026, and English-language machine translation thereof.

Office action by the Brazilian Patent Office issued in BR112025016435-0, which is a counterpart hereof, mailed Jan. 19, 2026, and English-language translation thereof.

Office action by the Japanese Patent Office issued in JP2025-545079, which is a counterpart hereof, mailed Jan. 6, 2026, and English-language machine translation thereof.

* cited by examiner

VACUUM BLOCKING PIECE AND METHOD FOR MANUFACTURING A SPECTACLE LENS

CROSS REFERENCE TO RELATED APPLICATIONS

This application is a continuation application of international patent application PCT/EP2024/059638, filed on Apr. 9, 2024 and designating the U.S., which claims priority to European patent application 23 167 300.5, filed on Apr. 11, 2023, both of which are hereby incorporated by reference in their entireties.

TECHNICAL FIELD

Provided are a blank contacting element, a vacuum blocking piece, and a method for manufacturing a spectacle lens. The disclosure is, thus, related to the manufacturing of spectacle lenses.

The exemplary embodiments are, thus, related to systems, devices, and methods for blocking lens blanks and for manufacturing ophthalmic lenses, in particular spectacle lenses.

For an industrial mass production of spectacle lenses made of plastic materials or mineral glass, particularly for spectacle lenses having a freeform surface, the lens blanks are blocked to a blocking piece using a device, which may be referred to as a blocking device, separate from the machining device for grinding or cutting the lens blanks. Blocking the lens blank is necessary to fix the lens blank in a defined position and in a mechanically resilient manner sustaining the milling or grinding process for individualizing the refractive power of the lens blank. The blocking piece, to which a lens blank is blocked, allows clamping the lens blank via the blocking piece in a form-fitting and/or force-fitting manner to the grinding or cutting machine.

BACKGROUND

According to related art the lens blank is attached to the blocking piece using a metallic alloy having a low melting temperature. The lens blank is positioned relative to the blocking piece with the finished front surface of the lens blank facing the blocking piece such that the surface normal of the lens blank and the surface normal of the blocking piece are positioned in a predetermined angle relative to each other and the space in between the blocking piece and the front surface of the lens blank is filled with the liquid metallic alloy. Afterwards, the blocking piece is chilled by a cooling device integrated into the blocking device to harden the metallic alloy to fix the lens blank to the blocking piece. This blocking method may be carried out manually or in an automated manner. After the metallic alloy is hardened, the blocking piece and the lens blank attached to it may be removed from the blocking device.

After the blocking step, the following manufacturing steps are typically carried out on the blocked lens blank: cutting the marginal contour of the spectacle lens, milling the intended refractive power into the back surface of the lens blank, polishing the milled surface by a polishing device, into which the blocked lens blank is inserted, and applying signature marks at the optical surface allowing an exact positioning of the optical surface.

Finally, the finished spectacle lens is removed from the blocking piece. In case of a metallic alloy used for blocking, the metallic alloy is heated, molten and submitted to a recycling process.

Using a metallic alloy for blocking lens blanks comes with environmental disadvantages. To remedy that, there have been attempts, for environmental reasons, to refrain from using a metallic alloy for blocking lens blanks. An alternative blocking method is described in DE 102005038063 A1, which suggests using a polymeric adhesive or a thermoplastic material, which can be cured by light irradiation.

In case of using a polymeric or thermoplastic material for blocking, submitting the blocking material after unblocking to a reuse of the blocking material is often not economical due to contaminations of the blocking material during the manufacturing process and due to mechanical and/or chemical alterations of the material over time.

An alternative approach for blocking a lens blank suggested in the related art is described in EP 2266754 B1. This suggested method uses a blocking piece having a supporting surface comprising ring-shaped recesses to fix the lens blank to the supporting surface by means of a vacuum. This approach, however, often leads to undesired deformations of the lens blank due to the recesses.

JP-H03121763A describes a vacuum adapter having several interdigitating cylindrical parts. DE 2531134A1 depicts a vacuum adapter, wherein the lens is contacted by flexible sealing rings. U.S. Pat. No. 3,134,208A shows a vacuum adapter having circular recesses, which may be evacuated. Further vacuum adapters are described in U.S. Pat. No. 4,089,102A and DE 3924078A1.

An alternative approach for blocking a lens blank known in related art is vacuum blocking, as described in EP 4035832A1, which is considered as closest related art. This technique uses a vacuum blocking piece having a lower part corresponding to the lower part of other conventional blocking pieces, which is adapted to be mountable in a conventional machine for mechanically processing the back surface of the lens blank.

U.S. Pat. No. 6,126,520 describes a fixture and a methodology for coupling an optical component to a machine through the use of vacuum. US 2015/0217420A1 describes a processing machine that has a lens retaining device for retaining a raw lens in a processing machine, wherein the raw lens is retained on the retaining device by means of an adhesion element. DE 2531134 A1 describes a device for machining spectacle lenses, wherein a lens holder comprises an elastic deformable sleeve connecting the outer edge of a shell with an outer edge of a supporting collar.

SUMMARY

An upper part of the conventional vacuum blocking piece has an element made of a rigid and porous material, such as ceramic, designed to receive a lens blank. This element, which is adapted in diameter and curvature to the convex surface of the lens blank to be vacuum blocked, is embedded in an airtight manner in a cylindrical support element and is firmly bonded onto and/or screwed to it. An air valve on the lower side of the adapter allows applying a vacuum to largely evacuate the air volume of the porous material/ceramic, thereby firmly sucking the lens blank to the surface of the element. For a robust sealing of the evacuated area to the outside, a circumferential sealing lip made of rubber on the outer edge of the top part may be provided. The adhesion required between the surface of the lens blank and the vacuum adapter to transfer the forces and torques that occur during mechanically processing of the lens blank is achieved by a combination of atmospheric contact pressure on the lens blank of approx. 8.0 to 8.5 $N/cm^2$ and the adhesion between a protective film bonded to the lens blank surface and the element of the vacuum blocking piece. To loosen the connection between the lens blank and the vacuum blocking piece, an interior of the vacuum blocking piece can be ventilated via the air valve, thus turning off the vacuum.

In conventional vacuum blocking processes, the existing final front surface of the lens blank, facing the blocking piece when blocked, is covered with a suitable protective film or varnish prior to blocking so that this front surface of the lens blank remains protected from damages on contact with the blocking piece during processing. Moreover, the protective film or varnish may be needed in conventional blocking techniques to provide sufficient adhesion between the lens blank and blocking piece by effects such as adhesion or micro-serration to provide a mechanical connection between the lens blank and the blocking piece being resilient to forces and moments occurring during mechanical processing.

In view of EP 4035832A1 as closest related art the objective technical problem of the claimed subject-matter may relate to providing an improved vacuum blocking piece and an improved method for manufacturing a spectacle lens, and optionally to providing an improved vacuum blocking piece and an improved method for manufacturing a spectacle lens offering increased environmental sustainability and reduced manufacturing costs for the spectacle lens.

This problem is solved by a blank contacting element in which the sealing lip and the blank contacting element are formed as a single piece, a vacuum blocking piece having the blank contacting element, and a method for vacuum blocking a lens with the vacuum blocking piece.

In a first aspect, a blank contacting element adapted for a use with a vacuum blocking piece suitable for vacuum blocking a lens blank is provided, wherein the blank contacting element is fluid-permeable and characterized in that at least an upper surface of the blank contacting element, which is adapted to contact the lens blank, is made of an elastic material.

In another aspect, a vacuum blocking piece for vacuum blocking a lens blank is provided. The vacuum blocking piece comprising a support element having an upper part and a lower part, wherein the lower part is adapted to engage with a clamping device for clamping the vacuum blocking piece. The vacuum blocking piece further comprises a fluid-permeable blank contacting element, wherein the blank contacting element is fluid-permeable and at least an upper surface of the blank contacting element, which is adapted to contact the lens blank, is made of an elastic material, the blank contacting element further having a lower surface (24) for contacting the upper part of the support element. The vacuum blocking piece is adapted to fix the lens blank to the upper surface of the blank contacting element by applying a vacuum within the blocking piece to provide a suction through essentially the entire upper surface of the blank contacting element to suck the lens blank to the upper surface of the blank contacting element and to suck the blank contacting element to the upper part of the support element.

In yet another aspect, a vacuum blocking piece for vacuum blocking a lens blank is provided. The vacuum blocking piece comprises a support element having an upper part and a lower part, wherein the lower part is adapted to engage with a clamping device for clamping the vacuum blocking piece. The vacuum blocking piece further comprises a fluid-permeable blank contacting element, wherein the blank contacting element is fluid-permeable and at least an upper surface of the blank contacting element, which is adapted to contact the lens blank, is made of an elastic material, the blank contacting element further having a lower surface for contacting the upper part of the support element. The vacuum blocking piece is adapted to fix the lens blank to the upper surface of the blank contacting element by applying a vacuum within the blocking piece to provide a suction through essentially the entire upper surface of the blank contacting element to suck the lens blank to the upper surface of the blank contacting element and to suck the blank contacting element to the upper part of the support element. The upper part of the support element is adapted to support the fluid-permeable blank contacting element and is formed of a rigid fluid-permeable material.

In another aspect, a vacuum blocking piece for vacuum blocking a lens blank is provided. The vacuum blocking piece comprises a support element having an upper part and a lower part, wherein the lower part is adapted to engage with a clamping device for clamping the blocking piece. The vacuum blocking piece further comprises a fluid-permeable blank contacting element according to the disclosure, the blank contacting element further having a lower surface for contacting the upper part of the support element. The blocking piece is adapted to fix the lens blank to the upper surface of the blank contacting element by applying a vacuum within the blocking piece to provide a suction through essentially the entire upper surface of the blank contacting element to suck the lens blank to the upper surface of the blank contacting element and to suck the blank contacting element to the upper part of the support element.

In yet another aspect, a method for manufacturing a spectacle lens is provided. The method comprises providing a vacuum blocking piece for vacuum blocking a lens blank, wherein the vacuum blocking piece comprises a fluid-permeable blank contacting element with an upper surface adapted to contact the lens blank, wherein at least the upper surface of the fluid-permeable blank contacted element is made of an elastic material, and wherein the vacuum blocking piece comprises a support element with an upper part and a lower part, wherein the lower part is adapted to engage with a clamping device for clamping the blocking piece and the upper part supports the fluid-permeable blank contacting element. The method further comprises arranging the lens blank at the upper surface of the blank contacting element such that a front surface of the lens blank entirely covers the upper surface. Moreover, the method comprises applying a vacuum within the vacuum blocking piece to provide a suction through the fluid-permeable elastic blank contacting element sucking the front surface of the lens blank to the entire upper surface of the fluid-permeable elastic blank contacting element, and mechanically processing at least a part of a back surface of the lens blank while the front surface of the lens blank is vacuum blocked to the vacuum blocking piece.

In yet another aspect, a method for manufacturing a spectacle lens is provided. The method comprises providing a vacuum blocking piece according to the disclosure. The method further comprises arranging the lens blank at the upper surface of the blank contacting element such that a front surface of the lens blank entirely covers the upper surface. The method further comprises applying a vacuum within the vacuum blocking piece to provide a suction through the fluid-permeable elastic blank contacting element sucking the front surface of the lens blank to the entire upper surface of the fluid-permeable elastic blank contacting element, and mechanically processing at least a part of a back surface of the lens blank while the front surface of the lens blank is vacuum blocked to the vacuum blocking piece.

In yet another aspect, the disclosure relates to a use of a blank contacting element according to the disclosure for providing an interface between a vacuum blocking piece and a lens blank.

A lens blank may relate to an unprocessed precursor of a spectacle lens, such as a lens blank having an unprocessed front surface and an unprocessed back surface. The lens blank may be provided in a molding process. The lens blank may, however, also relate to a partly processed precursor of a spectacle lens. For instance, the lens blank may have a front surface which is partially or fully processed, and which may be covered with a protective foil or coating. As generally understood and defined in section 3.8.1 of ISO 13666:2019 (E), a lens blank may be a piece of optical material with one optically finished surface for the making of a lens.

As generally understood and defined in section 3.5.2 of ISO 13666:2019 (E), a spectacle lens may be an ophthalmic lens according to section 3.5.1 of ISO 13666:2019 (E) worn in front of but not in contact with the eyeball.

A blocking piece relates to an adapter piece for mounting a lens blank into a processing device, in particular a processing device for machining and/or grinding and/or cutting and/or polishing the back surface of the lens blank according to prescription data and/or for edging the spectacle lens according to provided edging data. On one side, the blocking piece is adapted to contact a lens blank and, on another side, the blocking piece is adapted to engage in a processing device for processing the lens blank. The blocking piece is adapted to allow reversible blocking of a lens blank, wherein the blocked lens blank may be unblocked in a manner maintaining the integrity of the lens blank and in particular of the front surface of the lens blank, which may optionally be protected by a protective foil or coating. The blocking piece may be a block as generally understood and defined in DIN 58766 (2017). A vacuum blocking piece relates to a blocking piece using mainly or exclusively vacuum forces, i.e., a pressure due to suction within the vacuum blocking piece, for fixating the lens blank to the vacuum blocking piece, as for instance described in EP4035832A1. Accordingly, vacuum blocking a lens blank means fixating the lens blank to the blocking piece mainly or exclusively by using vacuum forces, i.e., a pressure due to suction within the vacuum blocking piece.

The blank contacting element being fluid-permeable means that a fluid stream of gas, in particular a stream of air, may be generated through the blank contacting element. In particular, a suction may be generated through the blank contacting element by applying a pressure difference between the outside and the inside of the blocking piece.

An elastic material is to be understood as a material having elastic mechanical properties. Thus, the elastic material may allow mechanical deformations when a mechanical force is applied to the material, wherein the deformations are at least partially reversible. After removal of an applied mechanical force the elastic material may at least partially return to its initial shape.

At least an upper surface of the blank contacting element being made of an elastic material is to be understood that at least the surface adapted to contact the lens blank when blocking the lens blank is made of the elastic material. Optionally the entire blank contacting element may be made of the elastic material. The blank contacting element may be made as a single piece of the elastic material.

The blank contacting element may be provided as a separate part from the vacuum blocking piece. However, according to some exemplary embodiments the blank contacting element may form an integral part of the vacuum blocking piece. The blank contacting element being adapted for a use with a vacuum blocking piece means that the blank contacting element and the vacuum blocking piece may be provided as an assembly for vacuum blocking a lens blank. The blank contacting element may provide an interface between the lens blank and the vacuum blocking piece when blocking the lens blank.

A suction through "essentially the entire upper surface" of the blank contacting element means that the suction and the possible air flow resulting from the suction is not restricted to certain minor sub-areas of the upper surface of the blank contacting element, such as recesses or holes provided only in a minor area of the upper surface of the blank contacting element. Instead, "essentially the entire upper surface" means that the suction is provided over a major part of the upper surface, in particular over an area of more than 90% of the accessible part of the upper surface and typically over the entire accessible upper surface. A part of the upper surface being accessible means that said part of the upper surface is not covered, but accessible to be contacted by the lens blank. This may be achieved by providing an elastic material having a porosity and/or by providing holes distributed over the entire upper surface of the blank contacting element.

The term "vacuum" relates to a pressure being well below the surrounding atmospheric pressure. A vacuum in this sense, however, does not require the entire absence of matter, as may be inferred from a strict scientific definition. Instead, a pressure reduced by at least 0.3 bar, optionally at least 0.5 bar, optionally at least 0.7 bar and optionally at least 0.8 bar relative to the atmospheric pressure (i.e., a total pressure of 0.7 bar, 0.5 bar, 0.3 bar and 0.2 bar, respectively) is considered as a vacuum within the meaning of the description.

The disclosure provides the advantage that the interface between the blank contacting element and the lens blank, i.e., the upper surface of the blank contacting element, offers mechanically soft properties which prevent damages at the lens blank when vacuum blocking the lens blank. Due to the elastic properties of the upper surface of the blank contacting element, the upper surface of the blank contacting element is softer than the lens blank and, hence, may avoid mechanical damages, such as scratches, to the lens blank when vacuum blocking the lens blank. This may provide the further advantages that applying a protection to the front surface of the lens bank, which is in contact with the blank contacting element when vacuum blocked, may be omitted, as there is no or merely a negligible risk of mechanical damages to the front surface of the lens blank arising from the contact with the blank contacting device. Consequently, additional steps for applying and removing protective measures to the lens blank may be omitted and, hence, the manufacturing costs for spectacle lenses may be reduced. Moreover, no machines for applying and removing protective measures have to be provided and maintained, which may further reduce the cost.

Moreover, a risk of damaging the lens blank in the process of applying and/or removing the protective measures, such as protection foils, may be reduced. Conventional processes for applying and/or removing protection foils often cause mechanical stress to the lens blank, which may result in the lens blank suffering damages around the edges. Such damages may be avoided according to the disclosure as no applying and/or removing of protection foils is required.

Moreover, as applying protective coatings and/or protection foils to the front surface of the lens blank may be omitted, the amount of waste produced during manufacturing of a spectacle lens may be reduced. This may further improve the environmental sustainability of the process for manufacturing spectacle lenses.

In addition, the disclosure may provide the advantage that the elastic material may provide a suitable static friction between the blank contacting element and lens blank and between the blank contacting element and the vacuum blocking piece for carrying out the mechanical processing of a back surface of the blocked lens blank without a necessary need for further adhesives or fixations. The provided static friction may be suitable for transferring a torque of up to 12 Nm or even 15 Nm, which may correspond to a typical value achievable by conventional blocking pieces based on alloy-blocking of spectacle lens blanks and which may, thus, be well suited for mechanically processing the blocked lens blank. However, optionally, in addition, an adhesive may be applied between the blank contacting element and the lens blank, which may increase the transferable torque. The adhesive may be a two-component adhesive. One or more spots of adhesive may be applied to the front surface of the lens blank and/or to the upper surface of the blank contacting element.

In particular, the elastic material may offer a significantly higher static friction than a rigid porous material, such as a porous ceramics material, as described in EP4035832A1.

The blank contacting element may be entirely made of the elastic material. This may allow forming the blank contacting element as a single piece made of a single material and, hence, may facilitate the production of the blank contacting element.

The elastic material may comprise at least one material selected from the group consisting of a polyurethane based material and a rubber-based material. Optionally, the elastic material may be formed as a foil made of one or more of these materials. Optionally a polyurethane-based material may comprise or consist of a polyurethane foam. These materials may provide the advantage of offering a suitable friction coefficient with respect to a smooth front surface of a lens blank and with respect to an upper surface of a support element, which may for instance be made of a ceramics material, SiC, $Al_2O_3$, or porous Aluminum. Moreover, rubber-based materials and/or polyurethane based materials, such as a polyurethane foil, may offer a suitable permeability for fluids, such as air, to apply a suction for vacuum blocking the lens blank through the blank contacting element. Furthermore, these materials may provide the advantage of having a compression set of less than 5% determined in accordance with ISO 1856:2000. Moreover, these materials may offer a shear modulus of more than 3 $N/mm^2$ determined in accordance with ISO 1827:2022. The vacuum blocking piece may be adapted to provide a static friction between the blank contacting element and the support element having a friction coefficient of up to 2.5. This may at least partially be achieved by selecting a suitable elastic material for the blank contacting element, such as a rubber-based material and/or a polyurethane-based material. The used elastic material may be chosen to have a Shore hardness between 50 and 80.

The elasticity modulus of a porous polyurethane foil may be in a range from about 3 $N/mm^2$ to about 10 $N/mm^2$.

The blank contacting element may be applied to the upper part of the support element by coating the upper surface of the support element. Alternatively or additionally, a blank contacting element may be pre-manufactured separately from the vacuum blocking piece. For instance, the blank contacting element may be manufactured in a vulcanization process. Moreover, the manufacturing process for the blank contacting element may include perforating holes into the vulcanized blank contacting element.

The blank contacting element may have a thickness in a range from 0.3 mm to 0.8 mm. This may ensure sufficient protection of the lens blank from mechanical scratches caused by the vacuum blocking piece. Moreover, this may allow for absorbing and/or damping mechanical impacts transferred from the vacuum blocking piece to the blocked lens blank, in particular during mechanical processing of the lens blank. In addition, the blank contacting device may allow for absorbing and/or damping impacts on the lens blanks and ensure that the shocks do not endanger the blocking of the lens blank.

The elastic material may be at least partly porous, wherein the fluid-permeability of the blank contacting element is at least partially caused by the porosity of the elastic material. This may be optionally achieved by forming the blank contacting element at least partly from a foam material, such as a polyurethane foam. The elastic material may exhibit an open porosity allowing a stream of fluid through the porous material. Such a fluid stream through the pores may be used to provide a suction causing the pressure for fixating the lens blank to the blank contacting element and the blank contacting element to the blocking piece during the blocking process. This may allow to ensure an even distribution of a fluid stream over the entire surface of the blank contacting element.

Alternatively or additionally the fluid-permeability of the blank contacting element is at least partially caused by one or more holes formed in the blank contacting element. The blank contacting element may comprise multiple holes distributed over the upper surface of the blank contacting element. The holes may be through holes extending over the entire thickness of the blank contacting element. The through holes may extend in a straight manner though the blank contacting element, i.e., along a direction of a pressure acting on the lens blank for fixating the lens blank to the blank contacting element. Alternatively or additionally, one or more holes may extend in a non-straight manner through the blank contacting element. This may allow using elastic materials offering no porosity and as such no fluid permeability. Moreover, this may allow adjusting the fluid-permeability of the blank contacting element by adjusting the number and size of the holes provided in the blank contacting element.

Optionally, the blank contacting element may be made of a porous material and exhibit one or more holes. This may allow that the fluid-permeability of the blank contacting element is partially caused by the porosity of the elastic material and partially by the one or more holes. This may allow combining the above-presented advantages of both approaches.

A shape and size of the upper surface of the blank contacting element correspond to a shape and size of the lens blank to be blocked. This may allow a flush arrangement of the blank contacting element and the blocked lens blank. Such a flush arrangement may reduce a risk of mechanical impact on the blank contacting element outside of the part of the upper surface being in contact with the lens blank, which may otherwise bear a risk of breaking a vacuum seal formed between the lens blank and the blocked blank contacting element and unintentionally releasing the blocked lens blank. Alternatively, when provided with a sealing lip, a size and/or shape of the sealing lip may be adjusted to the size and/shape of the lens blank. For instance, a difference in diameter of the blank contacting element and/or sealing lip compared to the lens blank may optionally deviate by 0.5 mm or less. This may facilitate a process of mechanically processing an edge of the lens blank.

The blank contacting element may further comprise a sealing lip arranged at a periphery of the blank contacting element, wherein the sealing lip is adapted to assist with providing a vacuum within the blocking piece and between the lens blank and the upper surface of the blank contacting element. The sealing lip may be advantageous for providing a tight fit of the blank contacting element to the curved front surface of the lens blank. Optionally, the sealing lip may offer a lower porosity or no porosity at all in contrast to an inner section of the blank contacting element. This may avoid or reduce a fluid stream entering the blank contacting element from the periphery of the blank contacting element when a lens blank is blocked.

The sealing lip may form an integral part of the blank contacting element and/or the support element. Alternatively, the sealing lip may be provided as a separate part not forming part of the blank contacting element and of the support element.

The sealing lip may be made from a material differing from the material of the blank contacting element and the material of the support element. This may allow adapting the properties of the sealing lip independently from the properties of the blank contacting element and the support element. The porosity of the material of the sealing lip may differ from the porosity of the material(s) of the blank contacting element and the support element. The sealing lip may be made of a non-porous material. This may allow providing a vacuum sealing at the outer edge between the blank contacting element and the blocked lens blank and to increase the area of vacuum applied to the blocked lens blank. This may increase the area at which suction force is applied to the blocked lens blank and, thus, increase the stability of the blocking. Alternatively or additionally, this may allow reducing the pressure difference between the ambient pressure and the applied vacuum.

The sealing lip may extend at the periphery of the blank contacting element in a radially outward direction of the vacuum blocking piece.

The sealing lip may be made of an elastic material, such as a poly-urethane based material and/or a rubber-based material. This may enhance the sealing lip's ability to adapt its shape to the front surface of the blocked lens blank facing the blank contacting element.

The blank contacting element may further comprise a lower surface adapted to contact the vacuum blocking piece, wherein the blank contacting element may comprise one or more protrusions extending from the lower surface of the blank contacting element. The one or more protrusions may be adapted to engage with the blocking piece when the blank contacting element is mounted at a vacuum blocking piece. Thus, the upper surface of a support element of the vacuum blocking piece may comprise one or more recesses, and the blank contacting element may comprise one or more protrusions adapted to mechanically engage with the one or more recesses at the upper surface of the support element when the blank contacting element is mounted at the support element. This may allow providing a form-fit between the blank contacting element and the blocking piece and, hence, may increase the stability of the connection between the blank contacting element and the vacuum blocking piece, in particular during rotational movements occurring when mechanically processing the back surface of the blocked lens blank. In other words, the blank contacting element and the upper surface of the support element may be adapted to interlock with each other in order to avoid a rotational movement of the blank contacting element and the support element relative to each other. Alternatively or additionally, the blank contacting element and the support element may be adapted to provide a mechanical interlocking with each other at an outer peripheral section of the blank contacting element.

The fluid-permeable blank contacting element may be adapted to form-fit an interface of the support element forming an interface with the blank contacting element. This may impede or rule out relative movements between the blank contacting element and the lens blank and, thus, improve a mechanical stability of an assembly comprising the blocking piece and the blank contacting element and eventually a blocked lens blank.

The upper part of the support element may be adapted to support the fluid-permeable blank contacting element and may formed of a rigid fluid-permeable material. The rigid fluid-permeable material of the support element may comprise or consist of one or more of the following materials: ceramic materials, carbide materials, in particular silicon carbide, oxide materials, in particular aluminum oxide, and aluminum foam. These materials provide the advantage that they intrinsically exhibit an open porosity or may be manufactured to exhibit an open porosity. In addition, these materials provide the advantage that they exhibit a high rigidity and, thus, have a high stability under pressure. Therefore, these materials offer a suitable combination of fluid-permeability and mechanical stability, which makes them suitable materials for a use in a blank contacting element. For example, a porous material having a certain degree of (open) porosity may be used, which is conventionally used for grinding or cutting processes. To give an example, such a material may be silicon carbide (referred to as 10C) having a medium hardness of the value "M" and a medium grain size of the value 60 according to the specifications of DIN 69100. A support element having an upper part made of such a material may pose suitable support for the fluid-permeable blank contacting element made out of an elastic material and may in particular allow for suction of fluid through the blank contacting element and the support element for vacuum blocking the lens blank.

The vacuum blocking piece may comprise an adhesive fixing the lower surface of the blank contacting element to the upper surface of the support element. This may further increase fixing of the blank contacting element to the vacuum blocking piece and, hence, further increase the stability of an assembly comprising a blank contacting element, a vacuum blocking piece, and a lens blank blocked thereto.

The vacuum blocking piece may further comprise a sealing lip being formed separately from the blank contacting element. This may allow a robust sealing of the evacuated area to the outside. To aid that purpose, a circumferential sealing lip made of rubber on the outer edge of the top part may be provided. Moreover, as the sealing lip may be separated from the blank contacting element, a mechanical impact on the sealing lip may not affect a mechanical contact between the lens blank and the blank contacting element.

The front surface of the lens blank and/or the upper surface of the blank contacting element may be treated by plasma in a vacuum chamber before blocking the lens blank. Alternatively or additionally, a polishing step may be applied to the front surface of the lens blank and/or the upper surface of the blank contacting element. This may remove contaminants from said surfaces, increase a surface energy and/or increase adhesive forces between the lens blank and the blank contacting element.

The upper surface of the blank contacting element may have a concave shape. In other words, the upper surface of the blank contacting element may have a hollow in its center and the edges of the blank contacting element may have a higher elevation than the center of the upper surface of the blank contacting element. This may facilitate contacting a front surface of a spectacle lens blank which may have a convex shape. The concave shape of the blank contacting element may be adapted to a convex shape of a lens blank to be blocked by the vacuum blocking piece comprising the blank contacting element.

The disclosure and all features presented with reference to the blank contacting element are to be regarded as disclosed also for the vacuum blocking piece and vice versa. The disclosure and all features presented with reference to the blank contacting element and/or the vacuum blocking piece and vice versa are to be regarded as disclosed also for the method for manufacturing a spectacle lens and vice versa.

It is understood by a person skilled in the art that the above-described features and the features described in the following description and drawings are not only disclosed in the explicitly disclosed exemplary embodiments and combinations, but that also other technically feasible combinations as well as the isolated features are comprised by the disclosure. In the following, several exemplary embodiments and specific examples are described with reference to the drawings for illustrating the disclosure without limiting the disclosure to the described exemplary embodiments.

BRIEF DESCRIPTION OF THE DRAWINGS

Exemplary embodiments of the disclosure will be illustrated in the following with reference to the drawings, wherein.

Figure 1A:
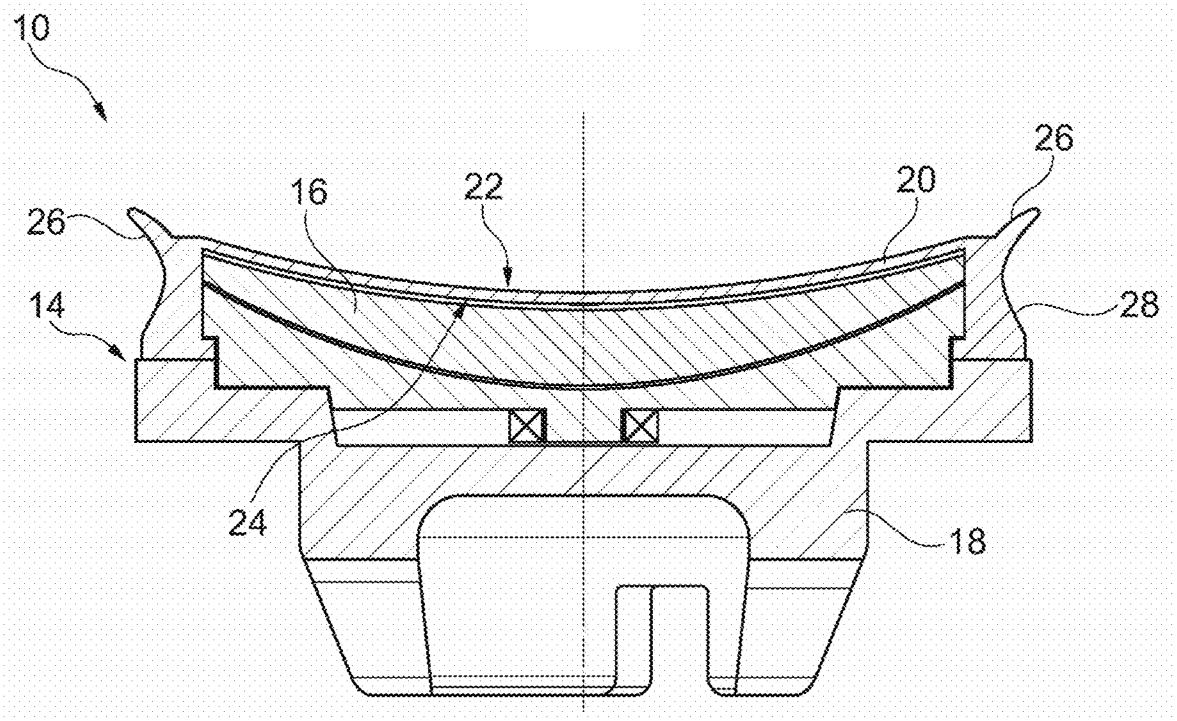
FIG. 1A shows an exemplary embodiment of a vacuum blocking piece in a cross-sectional view.

In the drawings the same reference signs are used for corresponding or similar features in different drawings.

DESCRIPTION OF EXEMPLARY EMBODIMENTS

Figure 1B:
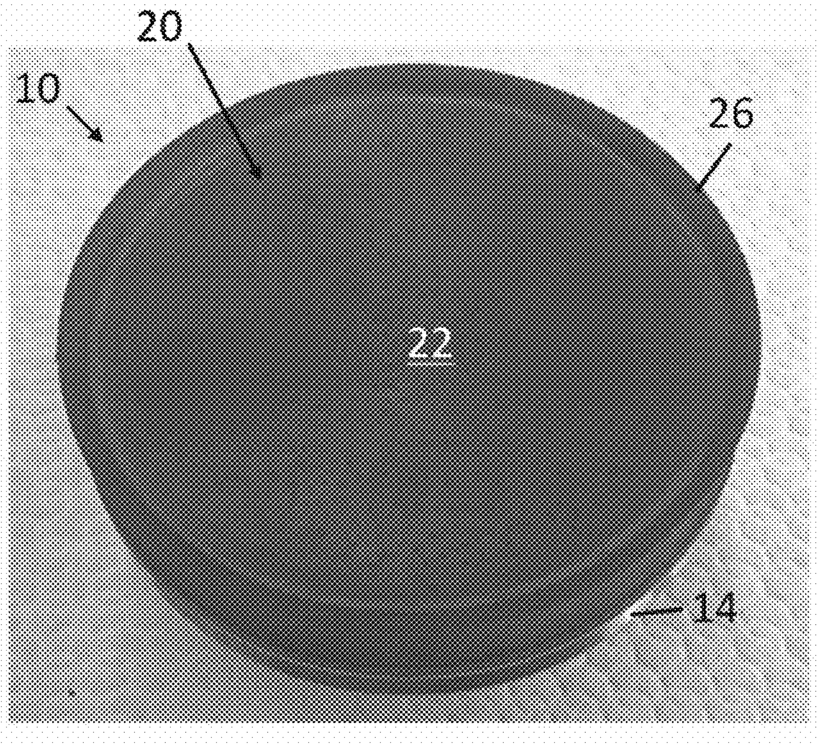
FIG. 1B shows the vacuum blocking piece of FIG. 1A in a perspective view.
Figure 1C:
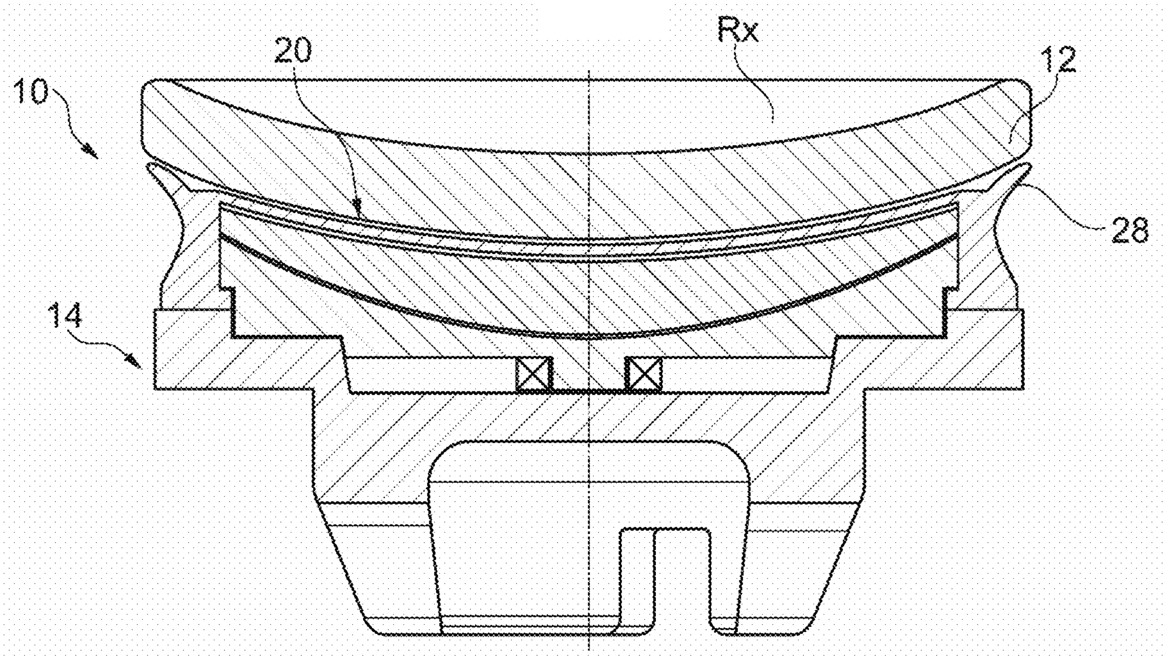
FIG. 1C shows the vacuum blocking piece of FIG. 1A holding a lens blank in a cross-sectional view.

FIG. 1A shows vacuum blocking piece 10 according to an exemplary embodiment for vacuum blocking a lens blank 12 (cf. FIG. 1C). The vacuum blocking piece 10 comprises a support element 14 having an upper part 16 and a lower part 18, wherein the lower part 18 is adapted to engage with a clamping device for clamping the blocking piece 10. The vacuum blocking piece 10 comprises a fluid-permeable blank contacting element 20. The blank contacting element comprises an upper surface 22, which is adapted to contact the lens blank 12, and which is made of an elastic material. Moreover, the blank contacting element has a lower surface 24 for contacting the upper part of the support element 16. The blocking piece 10 is adapted to fix the lens blank 12 to the upper surface 22 of the blank contacting element 20 by applying a vacuum within the vacuum blocking piece 10 to provide a suction through essentially the entire upper surface 22 of the blank contacting element 20 to suck the lens blank 12 to the upper surface 22 of the blank 12 contacting element and to suck the blank contacting element 20 to the upper part 16 of the support element 14.

The blank contacting element 20 may be entirely made of the elastic material. The elastic material may comprise at least one material selected from the group consisting of a poly-urethane based material and a rubber-based material. The elastic material may be at least partly porous, wherein the fluid-permeability of the blank contacting element 20 may at least partially be caused by the porosity of the elastic material.

A shape and size of the upper surface of the blank contacting element 20 may optionally correspond to a shape and size of the lens blank 12 to be blocked.

The blank contacting element 20 and/or the support element 14 of the vacuum blocking piece 10 may further comprise a sealing lip 26 arranged at a periphery of the blank contacting element 20, wherein the sealing lip 26 is adapted to assist with providing a vacuum within the vacuum blocking piece 10 and between the lens blank 12 and the upper surface 22 of the blank contacting element 20. According to the presented exemplary embodiment the sealing lip 26 and the blank contacting element 20 are formed as a single piece. In addition, the piece forming the blank contacting element 20 and the sealing lip 26 may have an extension 28 extending at the outside of the upper part of the supporting unit and may be clamped to the support element 14 of the vacuum blocking piece. This may allow fixating the blank contacting element 20 and the sealing lip 26 to the support element 14 in a particularly robust configuration. Optionally, the extension 28 may be clamped between the upper part 16 and the lower part 18 of the support element 14.

Thus, according to the exemplary embodiment depicted in FIG. 1A, the sealing lip 26 and the blank contacting element are formed together as one single piece. However, according to other exemplary embodiments the blank contacting element 20 may be formed without a sealing lip 28 and optionally a sealing lip 28 may be provided separately from the blank contacting element 20.

The working principle of the vacuum blocking device 10 may correspond to the working principle of a vacuum blocking device as described in EP 4035832A1.

The fluid-permeable blank contacting element 20 may be adapted to form-fit an interface of the support element 14 forming an interface with the blank contacting element. The upper part 16 of the support element 14 may be adapted to support the fluid-permeable blank contacting element 20 and may be made of a rigid fluid-permeable material.

The vacuum blocking piece 20 may be adapted to provide a static friction between the blank contacting element 20 and the support element 14 having a friction coefficient of 2.5 or more. The vacuum blocking piece may comprise an adhesive fixating the lower surface 24 of the blank contacting element 20 to the upper surface of the upper part 16 of the support element 14. This may further enhance the static friction between the blank contacting element 20 and the support element 14.

FIG. 1B depicts a blank contacting element 20 attached to a support element 14 of a vacuum blocking piece 10 in a perspective view. As demonstrated there, the upper surface 22 of the blank contacting element 20 and the sealing lip 26 are formed as one single piece.

FIG. 1C shows in a schematic sketch the vacuum blocking piece 10 presented in FIG. 1A having a lens blank 12 vacuum blocked thereto. The sealing lip 26 may have a diameter of 69 mm and the lens blank 12 may have a diameter of 70 mm.

Figure 1D:
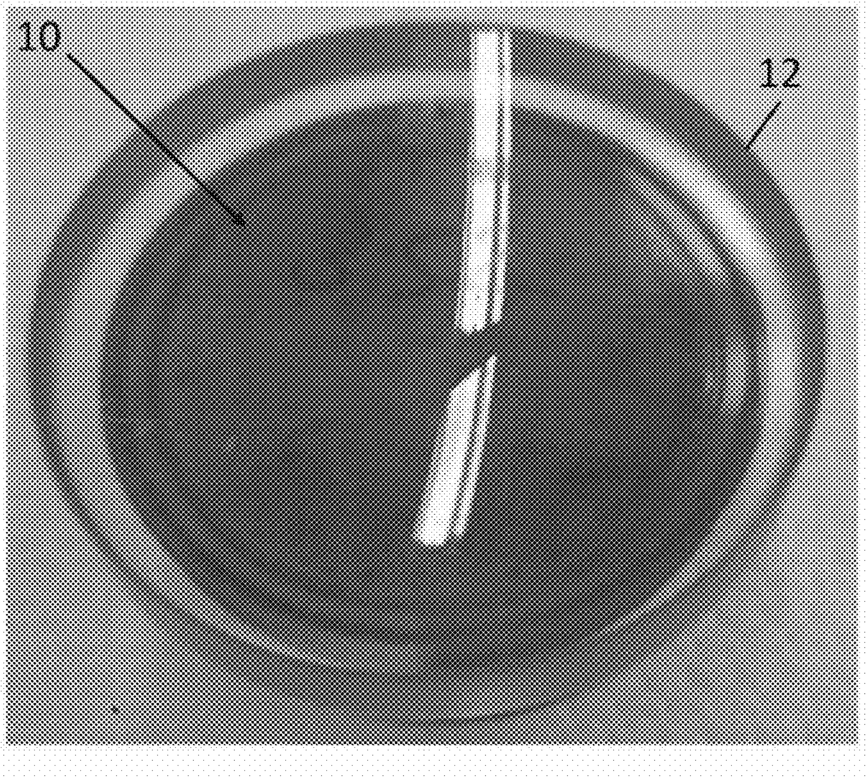
FIG. 1D shows the vacuum blocking piece according to FIG. 1C holding the lens blank in a perspective view.

FIG. 1D shows in a perspective view a lens blank 12 vacuum blocked to a vacuum blocking device according to the exemplary embodiment of FIG. 1B.

Figure 1E:
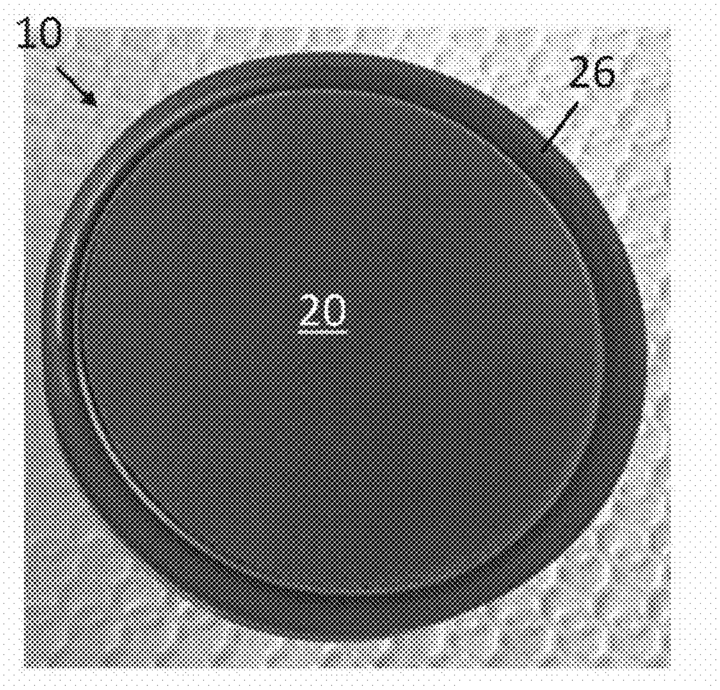
FIG. 1E shows another exemplary embodiment of a vacuum blocking piece in a top view.

FIG. 1E depicts in a perspective view a vacuum blocking device 10 having a blank contacting element 20 and a sealing lip 26 attached thereto. The sealing lip 26 is provided separately from the blank contacting element 20.

Figure 2A:
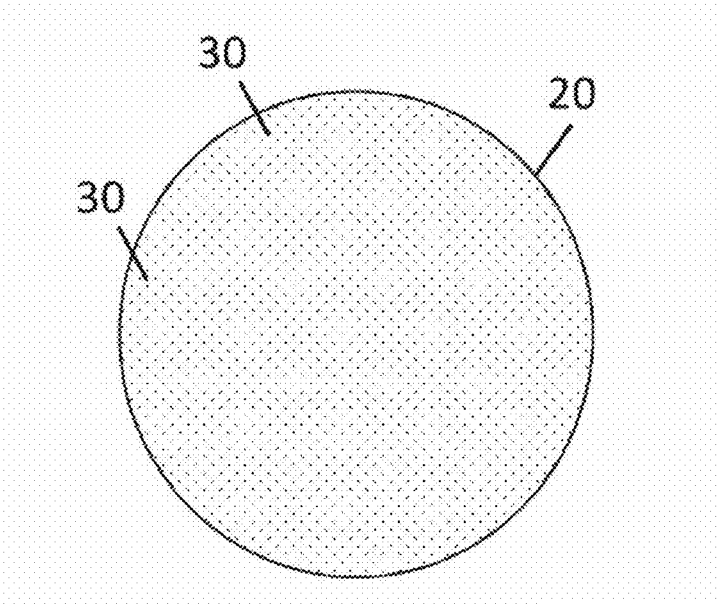
FIG. 2A shows a schematical view of a blank contacting element in a top view.

FIG. 2A schematically depicts a blank contacting element 20 in top view having multiple holes 30, indicated by dots, provided through the upper surface and through the entire thickness of the blank contacting element 20. The holes may be distributed over the entire upper surface of the blank contacting element and may allow achieving a homogeneous fluid flow through the upper surface of the blank contacting element 20. The blank contacting element 20 may be made of an elastic material, wherein the elastic material may be fluid-permeable or not impermeable. The fluid flow may solely be enabled by the holes 30 or may additionally be enabled by optional fluid-permeable properties of the elastic material. The holes may be evenly or randomly distributed. The holes may have the same size and/or shape or differ in their size and/or shape.

Figure 2B:
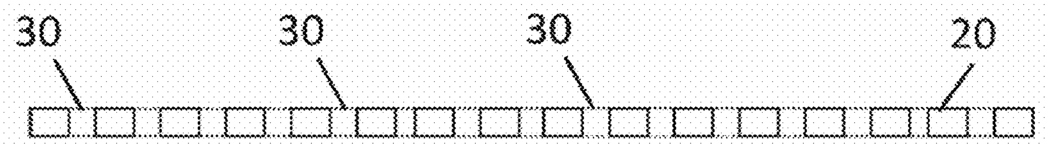
FIG. 2B show a schematical view of a blank contacting element in a cross-sectional view.

FIG. 2B schematically depicts the blank contacting element 20 in a cross-sectional view.

Figure 3:
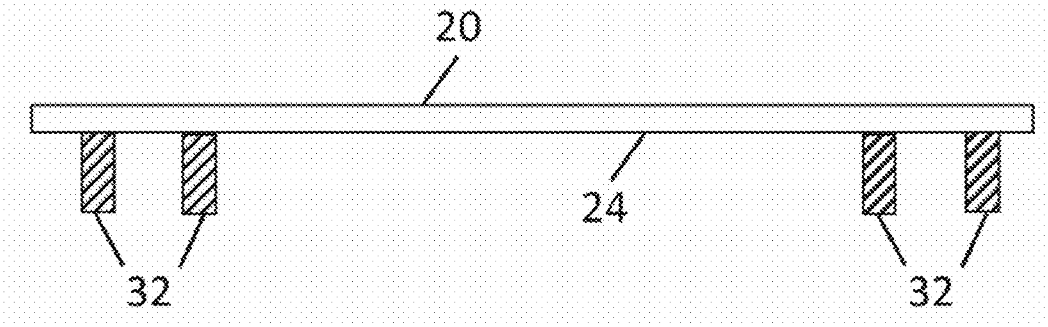
FIG. 3 shows a schematic view of a blank contacting element according to a further exemplary embodiment.

FIG. 3 presents in a schematical view a blank contacting element 20 according to another exemplary embodiment. According to this exemplary embodiment, the lower surface 24 of the blank contacting element 20, which is adapted to contact the vacuum blocking piece 10, comprises multiple protrusions 32 extending from the lower surface 24 of the blank contacting element 20. The one or more protrusions are adapted to engage with the blocking piece 10, in particular with the upper part 16 of the support element 14, when the blank contacting element 10 is mounted at a vacuum blocking piece 10. The upper part 16 of the support element 14 may comprise multiple recesses having an arrangement, a size and a shape allowing the protrusions 32 to engage with the support element 14. This may enhance a mechanical stability and prevent a relative movement of the blank contacting element 20 relative to the support element 14 when mechanically processing a lens blank 12 vacuum blocked to the vacuum blocking piece 10.

Figure 4:
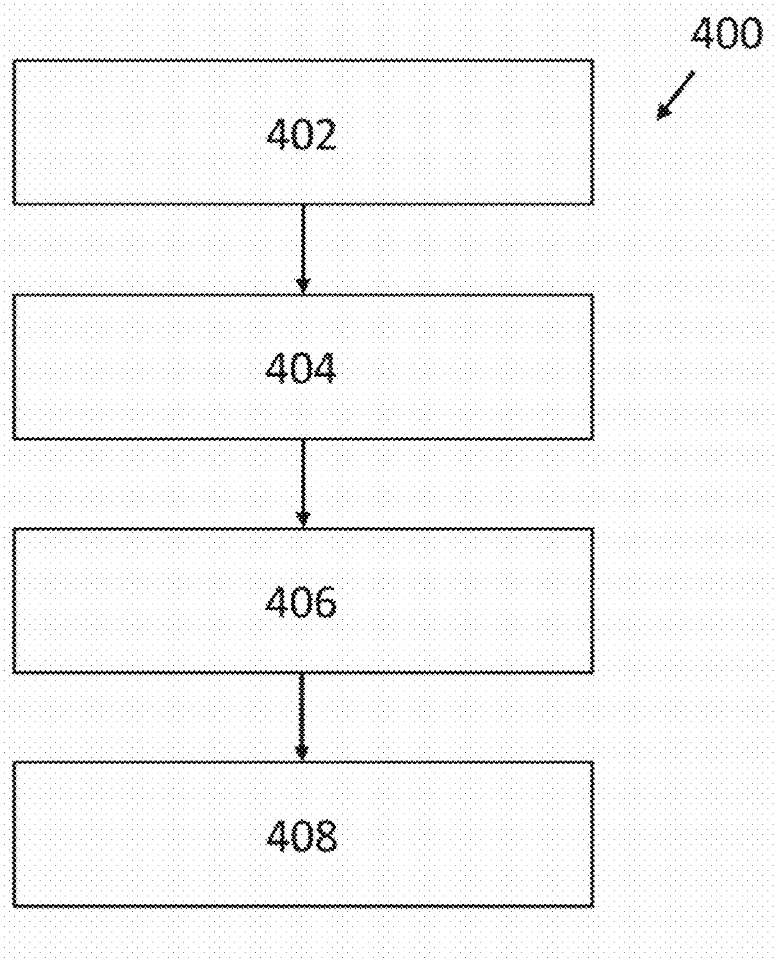
FIG. 4 shows a method according to an exemplary embodiment for manufacturing a spectacle lens.

FIG. 4 schematically depicts a method 400 for manufacturing a spectacle lens.

The method 400 comprises in a step 402 providing a vacuum blocking piece 10 for vacuum blocking a lens blank 12, the vacuum blocking piece 10 comprising a fluid-permeable blank contacting element 20 with an upper surface 22 adapted to contact the lens blank 12, wherein at least the upper surface 22 of the fluid-permeable blank contacting element 12 is made of an elastic material. Moreover, the blank contacting element 20 comprises a support element 14 with an upper part 16 and a lower part 18, wherein the lower part 18 is adapted to engage with a clamping device for clamping the vacuum blocking piece 10 and the upper part 16 supports the fluid-permeable blank contacting element 20.

The method 400 comprises in a step 404 arranging the lens blank 12 at the upper surface 22 of the blank contacting element 20 such that a front surface of the lens blank 12 entirely covers the upper surface 22.

In a step 406 the method 400 comprises applying a vacuum within the vacuum blocking piece 10 to provide a suction through the fluid-permeable elastic blank contacting element 20 sucking the front surface of the lens blank 12 to the entire upper surface 22 of the fluid-permeable elastic blank contacting element 20.

In a step 408 the method 400 comprises mechanically processing at least a part of a back surface of the lens blank 12 while the front surface of the lens blank 12 is vacuum blocked to the vacuum blocking piece 10.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 vacuum blocking piece
12 lens blank
14 support element
16 upper part of support element
18 lower part of support element
20 blank contacting element
22 upper surface of blank contacting element
24 lower surface of blank contacting element
26 sealing lip
28 extension of blank contacting element
30 hole
32 protrusion
400 method
402-408 method steps

The invention claimed is:

1. A vacuum blocking piece for vacuum blocking a lens blank, the vacuum blocking piece comprising:

a support element having an upper part and a lower part, wherein the lower part is configured to engage with a clamping device in at least one of a form-fitting manner and a force-fitting manner for clamping the vacuum blocking piece to a grinding machine to fix the lens blank in a defined position with respect to the grinding machine and in a mechanically resilient manner sustaining a milling or grinding process for individualizing a refractive power of the lens blank; and a fluid-permeable blank contacting element, wherein the fluid-permeable blank contacting element is fluid-permeable and at least an upper surface of the fluid-permeable blank contacting element, which is configured to contact the lens blank, is made of an elastic material, wherein the vacuum blocking piece is configured to fix the lens blank to the upper surface of the fluid-permeable blank contacting element by applying a vacuum within the vacuum blocking piece to provide a suction through essentially an entire upper surface of the fluid-permeable blank contacting element to suck the lens blank to the upper surface of the fluid-permeable blank contacting element and to suck the fluid-permeable blank contacting element to the upper part of the support element, wherein the vacuum blocking piece contains a sealing lip arranged at a periphery of the fluid-permeable blank contacting element, wherein the sealing lip is configured to assist with providing a vacuum within the vacuum blocking piece and between the lens blank and the upper surface of the fluid-permeable blank contacting element, wherein the sealing lip and the fluid-permeable blank contacting element are formed as a single piece, and wherein the single piece is a monolithic piece.

2. The vacuum blocking piece according to claim 1, wherein the fluid-permeable blank contacting element is entirely made of the elastic material.

3. The vacuum blocking piece according to claim 1, wherein the elastic material comprises at least one material selected from the group consisting of a poly-urethane based material and a rubber-based material.

4. The vacuum blocking piece according to claim 1, wherein the elastic material is at least partly porous and wherein the fluid-permeability of the fluid-permeable blank contacting element is at least partially caused by the porosity of the elastic material.

5. The vacuum blocking piece according to claim 1, wherein the fluid-permeability of the fluid-permeable blank contacting element is at least partially caused by one or more holes formed in the fluid-permeable blank contacting element.

6. The vacuum blocking piece according to claim 1, wherein a shape and size of the upper surface of the fluid-permeable blank contacting element correspond to a shape and size of the lens blank to be blocked.

7. The vacuum blocking piece according to claim 1, wherein the fluid-permeable blank contacting element comprises one or more protrusions extending from the lower surface of the fluid-permeable blank contacting element, the one or more protrusions being configured to engage with the support element when the fluid-permeable blank contacting element is mounted at the support element.

8. The vacuum blocking piece according to claim 1, wherein the fluid-permeable blank contacting element is configured to form-fit an interface of the support element forming an interface with the fluid-permeable blank contacting element.

9. The vacuum blocking piece according to claim 1, wherein the upper part of the support element is configured to support the fluid-permeable blank contacting element and is made from a rigid fluid-permeable material.

10. The vacuum blocking piece according to claim 1, wherein the vacuum blocking piece is configured to provide a static friction between the fluid-permeable blank contacting element and the support element having a friction coefficient of 2.5 or more.

11. The vacuum blocking piece according to claim 1, wherein the upper part of the support element comprises one or more recesses and wherein the fluid-permeable blank contacting element comprises one or more protrusions configured to mechanically engage with the one or more recesses at the upper part of the support element when the fluid-permeable blank contacting element is mounted at the support element.

12. The vacuum blocking piece according to claim 1, wherein the vacuum blocking piece comprises an adhesive fixing the lower surface of the fluid-permeable blank contacting element to the upper part of the support element.

13. A method for manufacturing a spectacle lens, the method comprising:

providing a vacuum blocking piece according to claim 1;

arranging the lens blank at the upper surface of the fluid-permeable blank contacting element such that a front surface of the lens blank entirely covers the upper surface;

applying a vacuum within the vacuum blocking piece to provide a suction through the fluid-permeable elastic blank contacting element sucking the front surface of the lens blank to the entire upper surface of the fluid-permeable elastic blank contacting element; and mechanically processing at least a part of a back surface of the lens blank while the front surface of the lens blank is vacuum blocked to the vacuum blocking piece.

* * * * *